(12) United States Patent
Ezumi

(10) Patent No.: US 8,218,201 B2
(45) Date of Patent: Jul. 10, 2012

(54) FACSIMILE MACHINE

(75) Inventor: Yosuke Ezumi, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 12/606,862

(22) Filed: Oct. 27, 2009

(65) Prior Publication Data

US 2010/0103473 A1    Apr. 29, 2010

(30) Foreign Application Priority Data

Oct. 28, 2008 (JP) ................. 2008-276979

(51) Int. Cl.
*H04N 1/00* (2006.01)
*H04N 1/36* (2006.01)

(52) U.S. Cl. ....................... 358/407; 358/422

(58) Field of Classification Search .............. 358/407, 358/410, 420, 421, 422, 423
See application file for complete search history.

(56) References Cited

U.S. PATENT DOCUMENTS

| | | | |
|---|---|---|---|
| 4,821,312 A | 4/1989 | Horton | |
| 4,910,764 A | 3/1990 | Bowen | |
| 5,086,455 A | 2/1992 | Satomi | |
| 5,642,409 A | 6/1997 | Kotani | |
| 6,903,835 B1 * | 6/2005 | Naoi | 358/1.15 |
| 2005/0031098 A1 | 2/2005 | Ito | |
| 2005/0271197 A1 | 12/2005 | McClure | |

FOREIGN PATENT DOCUMENTS

| | | |
|---|---|---|
| EP | 1292093 A | 3/2003 |
| JP | 05-130310 A | 5/1993 |
| JP | 06141104 A | 5/1994 |
| JP | 9-008950 A | 1/1997 |
| JP | 2005-057659 A | 3/2005 |

* cited by examiner

*Primary Examiner* — Douglas Tran
(74) *Attorney, Agent, or Firm* — Canon U.S.A., Inc. IP Division

(57) ABSTRACT

A facsimile machine, capable of being connected to an external telephone, including a data access apparatus in the form of a semiconductor device, includes a power circuit configured to output a calling signal and supply voltage to the external telephone; a relay configured to switch between a first state in which the external telephone is connected to the power circuit and a second state in which the external telephone is connected to a public line; a detection portion configured to detect a signal level of a signal line between the power circuit and the relay; and a control portion configured to issue an output instruction of the calling signal to the power circuit on the basis of the content of a signal received by the data access apparatus and a detection result obtained by the detection portion in the first state.

14 Claims, 9 Drawing Sheets

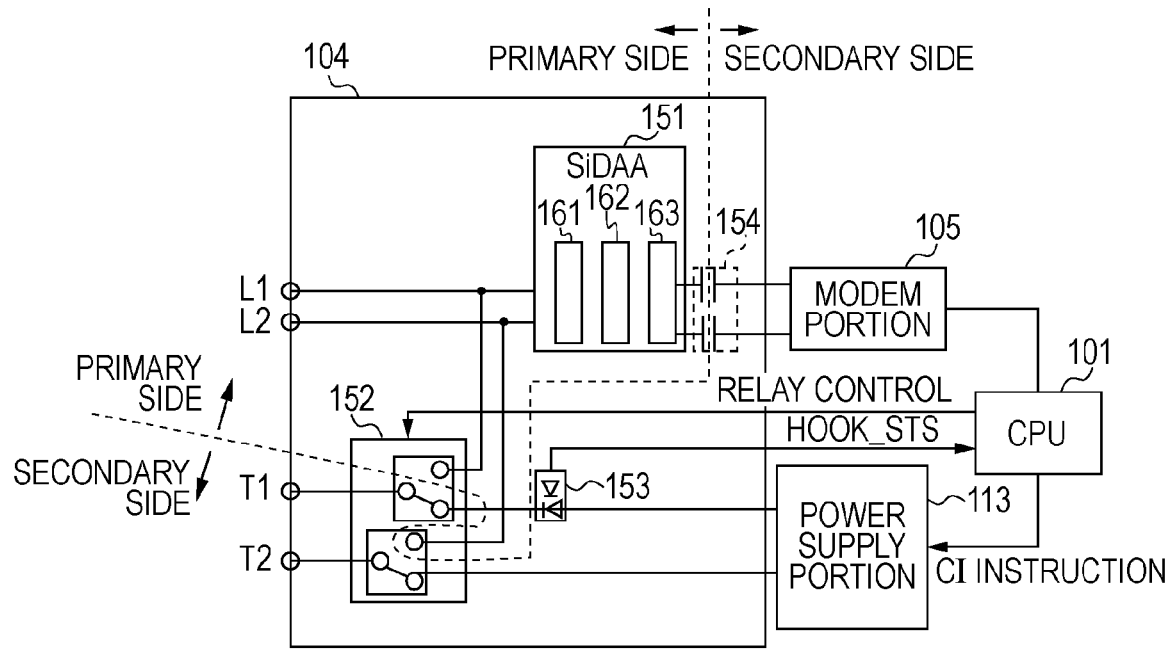
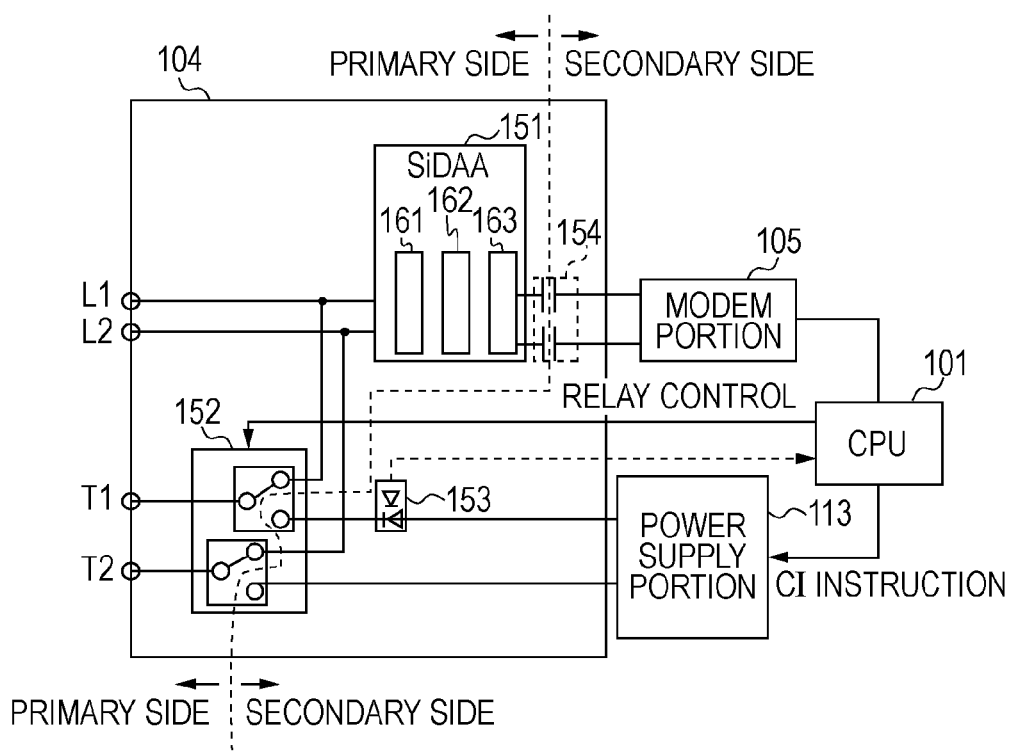

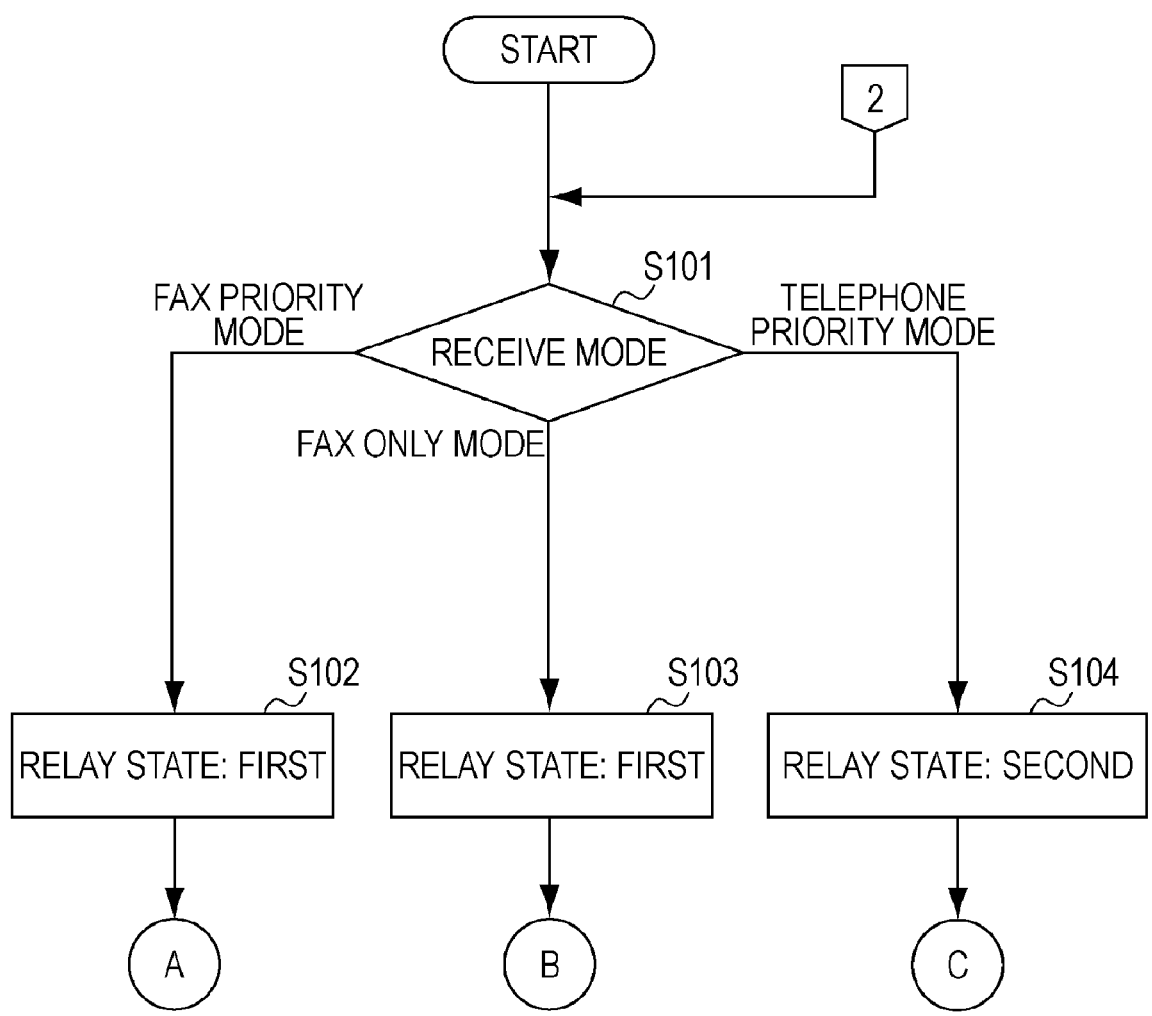

FACSIMILE MACHINE

BACKGROUND OF THE INVENTION

1. Field of the Invention

The present invention relates to facsimile machines, and in particular, relates to facsimile machines including data access apparatuses in the form of semiconductor devices.

2. Description of the Related Art

In order to reduce the size of facsimile machines, data access apparatuses in the form of semiconductor devices are used in interfaces (I/Fs) between the facsimiles machines and telephone lines. These data access apparatuses in the form of the semiconductor devices are expressed as semiconductor data access arrangement (DAA) or SiDAA. Moreover, the facsimile machines are configured such that external telephones can be connected thereto and such that the facsimile machines and the external telephones can use the same telephone lines. Japanese Patent Laid-Open No. 9-8950 describes a structure that detects current using an off-hook detector 2 disposed between an external telephone and a telephone line as shown in FIG. 8 so as to detect the on-hook/off-hook state of the external telephone. Moreover, Japanese Patent Laid-Open No. 2005-57659 describes a structure that detects changes in line voltage in accordance with the on-hook/off-hook state of an external telephone using a voltage-detection function included in a SiDAA as shown in FIG. 9.

However, the structure described in Japanese Patent Laid-Open No. 9-8950 uses line current obtained by the off-hook detector 2 disposed at a primary side of the line for detecting the on-hook/off-hook state of the external telephone. With this structure, the direction of the line current changes in accordance with the connection state of the line. Therefore, the detector needs to detect bidirectional current, and the configuration of the current detection circuit of the detector becomes complicated. This prevents size reduction of the circuit.

Moreover, the structure described in Japanese Patent Laid-Open No. 2005-57659 cannot detect the on-hook/off-hook state of the external telephone after SiDAA is connected to the line for facsimile transmission/reception.

SUMMARY OF THE INVENTION

The present invention is directed to a facsimile machine with a small-scale circuit capable of detecting the on-hook/off-hook state of an external telephone and ringing the external telephone even during facsimile transmission/reception.

A facsimile machine, capable of being connected to an external telephone, including a data access apparatus in the form of a semiconductor device that performs signal transmission/reception via a public line, includes a power supply unit configured to output a calling signal and supply power to the external telephone; a relay configured to switch between a first state in which the external telephone is connected to the power supply unit and a second state in which the external telephone is connected to the public line; a detection unit configured to detect a state of a signal line between the power supply unit and the relay; and a control unit configured to issue an output instruction of the calling signal to the power supply unit on the basis of a signal received by the data access apparatus and a detection result obtained by the detection unit in the first state.

Further features of the present invention will become apparent from the following description of exemplary embodiments with reference to the attached drawings.

BRIEF DESCRIPTION OF THE DRAWINGS

FIGS. 2A and 2B illustrate a communication control portion according to the exemplary embodiment.

FIG. 3 illustrates an example control flow of the facsimile machine according to the exemplary embodiment.

DESCRIPTION OF THE EMBODIMENTS

An exemplary embodiment of the present invention will now be described in detail with reference to the drawings.

Figure 1:
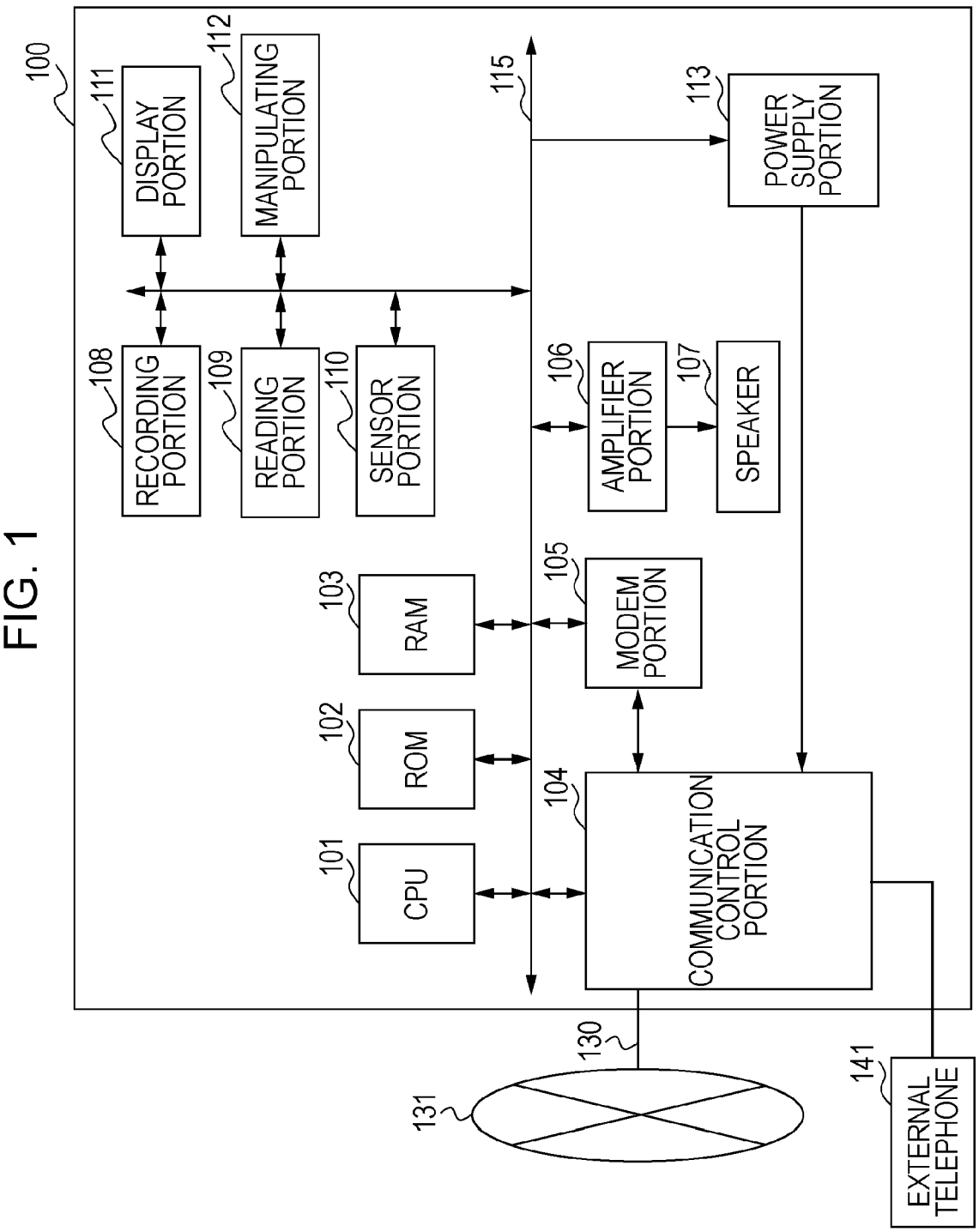
FIG. 1 illustrates an example configuration of a facsimile machine according to an exemplary embodiment of the present invention.

FIG. 1 is a block diagram illustrating an electrical configuration of a facsimile machine 100. A central processing unit (CPU) 101 controls the facsimile machine in accordance with programs stored in a read-only memory (ROM) 102. The CPU 101 controls data communication using a communication control portion 104, readout of originals using a reading portion 109, and recording on recording media using a recording portion 108. The ROM 102 stores, for example, programs shown in flow charts (described below), a program for controlling a modem portion 105, and programs for, for example, displaying caller IDs.

A random-access memory (RAM) 103 is a memory for temporarily storing various data during the operations of the facsimile machine 100, and stores line voltages detected by a semiconductor data access apparatus (SiDAA) 151 (see FIGS. 2A and 2B) and a determination value. The line voltages are values supplied to the SiDAA 151 while a telephone line 130 is open, that is, while a direct-current (DC) circuit for controlling a network is open in the SiDAA 151.

Moreover, the line voltages are stored in the order in which they are detected by a voltage detection unit in the SiDAA while the telephone line 130 is open.

These line voltages are detected in accordance with receive modes, and are used for on-hook/off-hook determination (in other words, hook-up/hook-down determination) of an external telephone 141 (described below).

The determination value is a reference value used for the on-hook/off-hook determination of the external telephone 141. This reference value is used for detecting the hook-up state of the external telephone. Moreover, the detection is performed at regular time intervals while the telephone line 130 is open. On the other hand, when the facsimile machine 100 captures the line prior to the external telephone, the CPU 101 performs the on-hook/off-hook determination on the basis of detection results obtained by a current detection portion (hook detection portion) 153 shown in FIGS. 2A and 2B instead of the detection results of voltage obtained by the SiDAA 151. The current detection portion 153 is disposed between a power supply portion (power circuit) 113 and the external telephone 141.

In addition, the RAM 103 includes a memory region for storing communication histories, image data, and bit images for printing. The RAM 103 is, for example, a dynamic RAM (DRAM).

Received image data is stored in the RAM 103, and deleted from the memory after being recorded on recording sheets by the recording portion 108. Moreover, image data read by the reading portion 109 is also stored in the RAM 103.

The communication control portion 104 is an interface with a public line 131, and the modem portion 105 connected thereto modulates and demodulates image information and communication data before transmitting them. The modem portion 105 performs facsimile communication with the telephone line 130 via the communication control portion 104.

The reading portion 109 reads images of originals placed on a flatbed platen using a scanner, and includes a motor for driving the scanner. When facsimiles are sent, read image data is encoded. When facsimiles are received, decoded data is recorded on recording sheets by the recording portion 108.

The recording portion 108 includes an ink-jet printer including a recording head that ejects ink onto recording sheets, a carriage having the recording head installed therein, a carriage motor that moves the carriage, and a convey motor that conveys the recording sheets.

An amplifier portion 106 outputs ringing tones and warning tones by ringing a speaker 107. A sensor portion 110 detects, for example, the existence of recording sheets, the position of the recording head, and the opened or closed state of covers. A display portion 111 is a display device such as a color LCD, and displays, for example, the time, operations of the facsimile machine, line statuses during communication, and error statuses.

A manipulating portion 112 is constituted by dialing keys for inputting, for example, numbers to be dialed and alphabet characters and symbols of URLs, and includes, for example, a send key and a receive key for facsimile transmission/ reception, a hook key for switching the on-hook/off-hook state, and a select key for function settings.

The power supply portion 113 is a switching power supply that generates DC voltage from a commercial power supply input from outside the apparatus. The power supply portion 113 generates, for example, a voltage supplied to logic circuits such as the CPU 101 (for example, 5 volts), a voltage for driving the recording head, a voltage for detecting the off-hook state of the external telephone (24 volts), and a voltage for outputting calling signals (−150 volts). As described above, the power supply portion 113 generates voltages used for detecting the off-hook state and used for outputting pseudo calling indicator (CI) signals.

When the power supply portion 113 outputs a voltage for detecting the off-hook state of the external telephone, the power supply portion 113 supplies a current sufficient to detect the off-hook state of the external telephone. Moreover, the power supply portion 113 can output calling signals (CI signals) to the external telephone. At this moment, rectangular pulses of −150 volts described above are output.

FIGS. 2A and 2B illustrate the configuration of the communication control portion 104 including the SiDAA 151. The SiDAA 151 includes a voltage detection portion 161, a coder/decoder (CODEC) 162, and a serial interface portion 163.

Terminals L1 and L2 are connected to the telephone line 130, and terminals T1 and T2 are connected to the external telephone 141. The external telephone can be connected to the facsimile machine via these terminals T1 and T2.

The voltage detection portion 161 detects the voltage of the telephone line 130. When a relay 152 is in a state shown in FIG. 2B, the voltage detection portion 161 can detect whether the external telephone is on-hook or off-hook from the voltage change of the telephone line 130.

The CODEC 162 performs analog-to-digital (A/D) conversion and digital-to-analog (D/A) conversion of facsimile data. The facsimile data in digital form is transferred between the serial interface portion 163 and the modem portion 105 in serial communication.

The communication control portion 104 further includes the relay 152 that switches between connection and disconnection of the external telephone to/from the telephone line and the current detection portion 153 that detects the off-hook state using power supplied from the power supply portion 113.

The current detection portion 153 includes a photocoupler (one-way photocoupler, sensor) that operates with a unidirectional voltage, and the CPU 101 can acquire the output state (detection results) of the photocoupler as shown in FIG. 2A. In other words, the CPU 101 can acquire information on the signal level of a signal line to which the photocoupler is connected. When the external telephone is off-hook, a loop having a path from the power supply portion 113 to the current detection portion 153, the relay 152, the terminal T1, the external telephone 141, the terminal T2, and to the relay 152 is formed, thereby it can be determined whether the external telephone is on-hook or off-hook. For example, the signal level of HOOK_STS signal is high (H) when the external telephone is off-hook, and the signal level is low (L) when the external telephone is on-hook. In this manner, the CPU 101 determines whether the external telephone is on-hook or off-hook on the basis of the state of the signal (signal level) between the power circuit and the relay.

The modem portion 105 is insulated from the telephone line 130 by being connected thereto via an insulating portion 154. A high voltage capacitor is used for the insulating portion 154. Broken lines shown in FIGS. 2A and 2B are boundaries between a primary side and a secondary side of the line. Since the current detection portion 153 is disposed at the secondary side of the line as shown in FIGS. 2A and 2B, the cost of the current detection portion 153 can be reduced.

With this configuration, the modem portion 105 performs facsimile communication with the telephone line 130 via the communication control portion 104.

Next, the relay 152 will be described with reference to FIGS. 2A and 2B. FIGS. 2A and 2B differ from each other in only the state of the relay 152. In FIG. 2A, the external telephone and the telephone line are disconnected from each other (first state). In this state, the external telephone and the power supply portion 113 are connected to each other. In FIG. 2B, the external telephone and the telephone line are connected to each other (second state). The relay 152 is switched as described above on the basis of the control by the CPU 101.

When a facsimile-priority mode or a facsimile-only mode is set as the receive mode, the facsimile machine is set to the state shown in FIG. 2A. On the other hand, when a telephone-priority mode is set as the receive mode, the facsimile machine is set to the state shown in FIG. 2B.

The control of the facsimile machine will be now described with reference to FIG. 3. The set receive mode is determined in Step S101. When it is determined that the facsimile-priority mode is set as the receive mode, the process proceeds to Step S102 whereat the relay 152 is set to the first state shown in FIG. 2A. Subsequently, the process proceeds to A. When it is determined that the facsimile-only mode is set as the receive mode, the process proceeds to Step S103 whereat the relay 152 is set to the first state shown in FIG. 2A. Subsequently, the process proceeds to B. When it is determined that the telephone-priority mode is set as the receive mode, the process proceeds to Step S104 whereat the relay 152 is set to the second state shown in FIG. 2B. Subsequently, the process proceeds to C.

Figure 4:
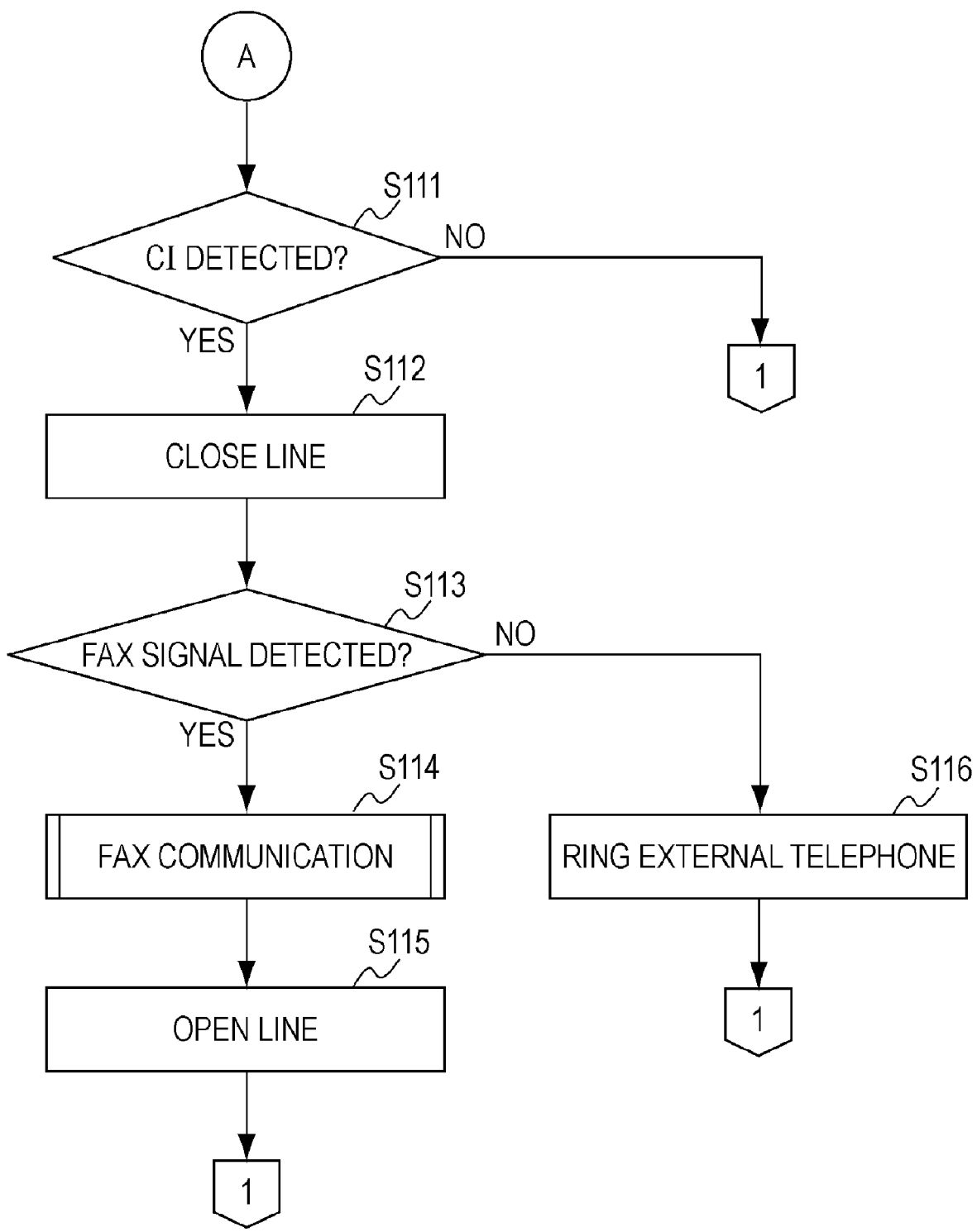
FIG. 4 illustrates an example control flow of the facsimile machine according to the exemplary embodiment.

FIG. 4 illustrates a control flow in the facsimile-priority mode. In this control flow, when a calling signal (CI signal) from the telephone line is detected (Yes in Step S111), the line is closed (captured; Step S112).

Subsequently, when a facsimile signal is detected (Yes in Step S113), the facsimile communication is performed (Step S114). When the facsimile communication is completed, the line is opened (Step S115). In this manner, when the facsimile signal is detected, the external telephone does not ring. Herein, the facsimile signal is detected by, for example, detecting a calling signal (CNG signal) sent from a sender.

On the other hand, when no facsimile signal is detected (No in Step S113), the external telephone is driven to ring (Step S116). Upon receiving a CI instruction (output instruction) output from the CPU 101, the power supply portion 113 outputs a calling signal. The external telephone rings upon receiving the calling signal. The external line rings in the same manner as it rings upon receiving the calling signal from the telephone line. Subsequently, the process proceeds to "1" shown in FIG. 7.

The state of the external telephone is detected by the current detection portion 153 in Step S141.

When the current detection portion 153 detects that the state of the external telephone is changed from on-hook to off-hook, the CPU 101 sets the relay 152 to the second state in Step S142. That is, the CPU 101 performs control so as to connect the external telephone to the telephone line. In this state, the operator of the external telephone can have a telephone conversation with the caller. Subsequently, the process returns to Step S141. When the current detection portion 153 detects that the state of the external telephone is changed from off-hook to on-hook, the CPU 101 switches the relay 152 to the first state in Step S143.

Figure 7:
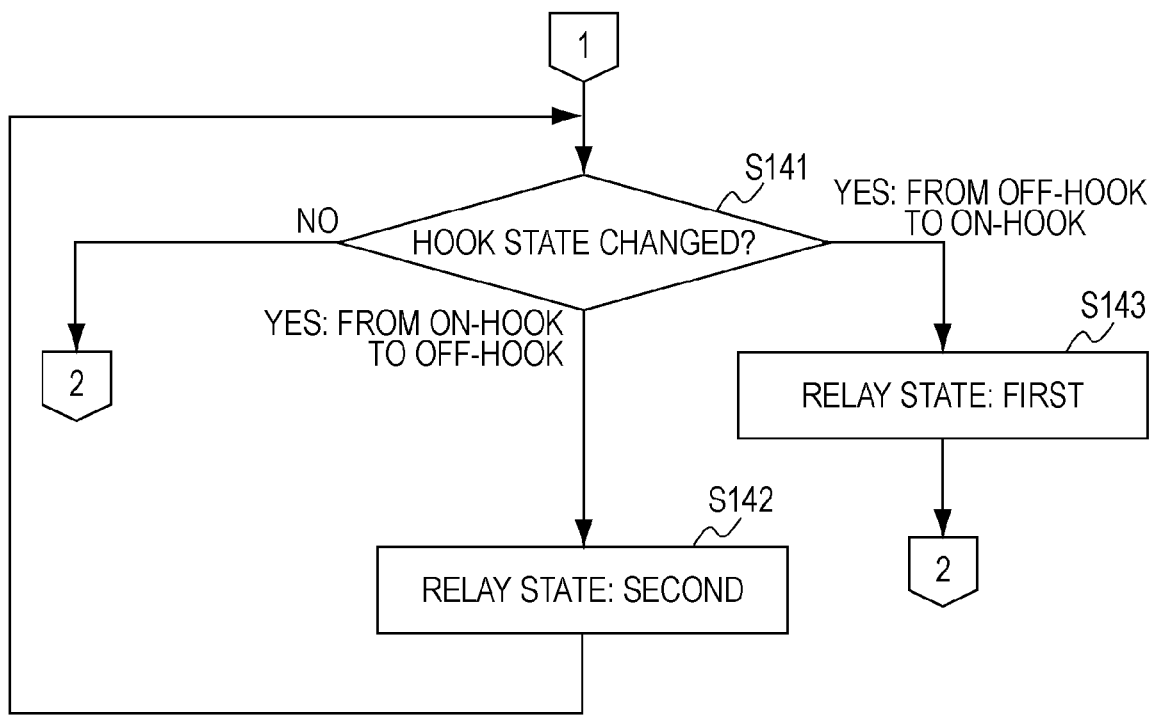
FIG. 7 illustrates an example control flow of the facsimile machine according to the exemplary embodiment.
Figure 8:
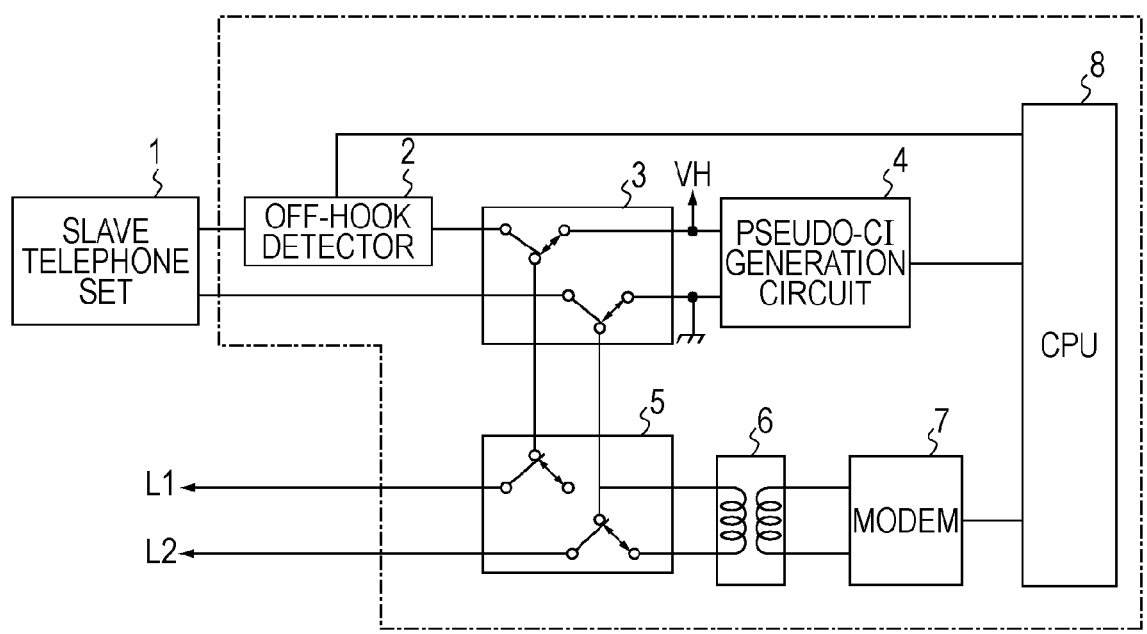
FIG. 8 illustrates a known technology.
Figure 9:
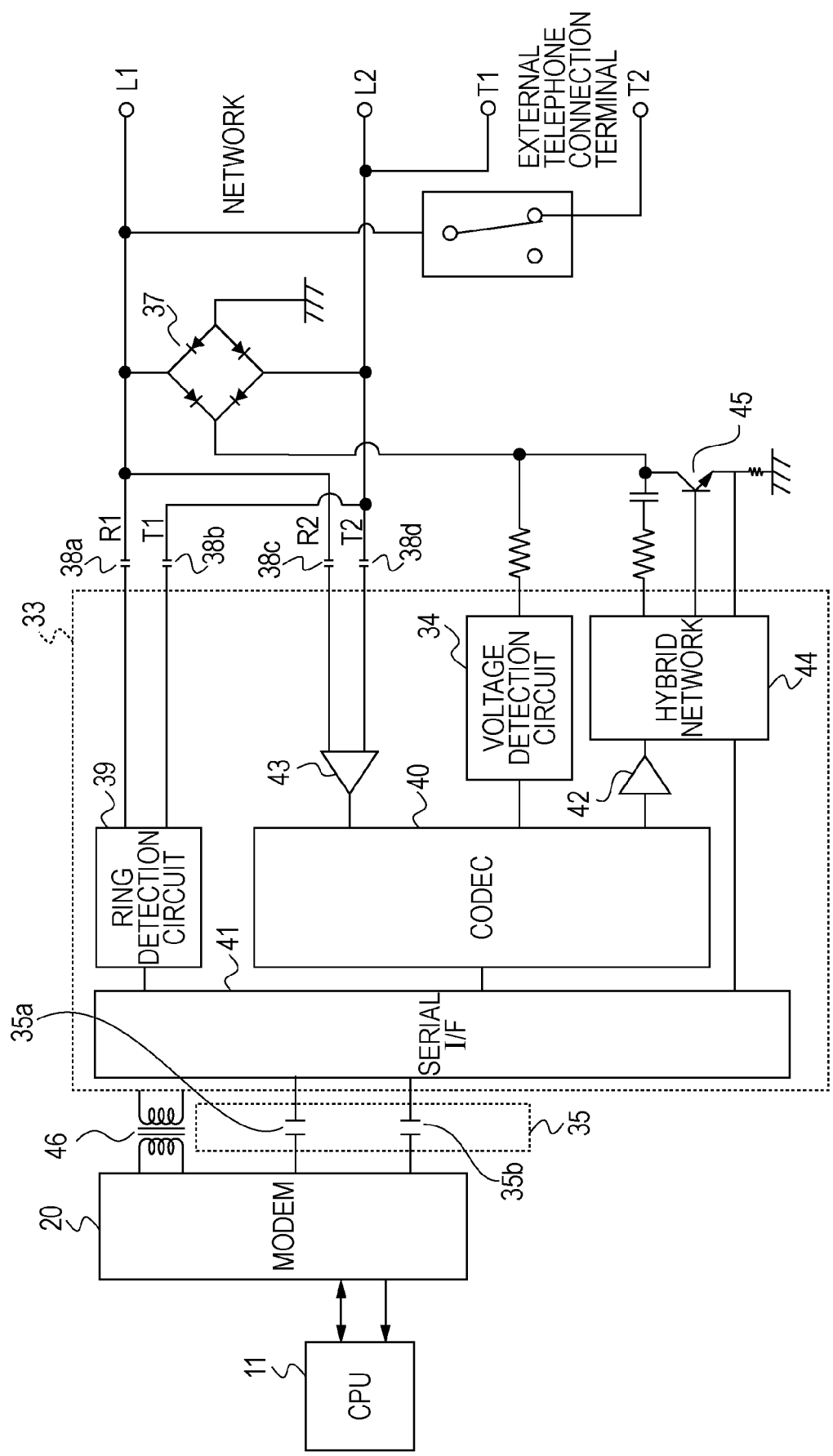
FIG. 9 illustrates another known technology.

On the other hand, when no calling signal (CI signal) from the telephone line is detected (No in Step S111), the process proceeds to "1" shown in FIG. 7. The state of the external telephone is detected by the current detection portion 153 in Step S141. When the current detection portion 153 detects that the state of the external telephone is changed from on-hook to off-hook, the CPU 101 sets the relay 152 to the second state in Step S142. That is, the CPU 101 performs control so as to connect the external telephone to the telephone line. In this state, the operator of the external telephone can call a receiver (send a call) so as to have a telephone conversation. Subsequently, the process returns to Step S141. When the current detection portion 153 detects that the state of the external telephone is changed from off-hook to on-hook, the CPU 101 switches the relay 152 to the first state in Step S143.

Figure 5:
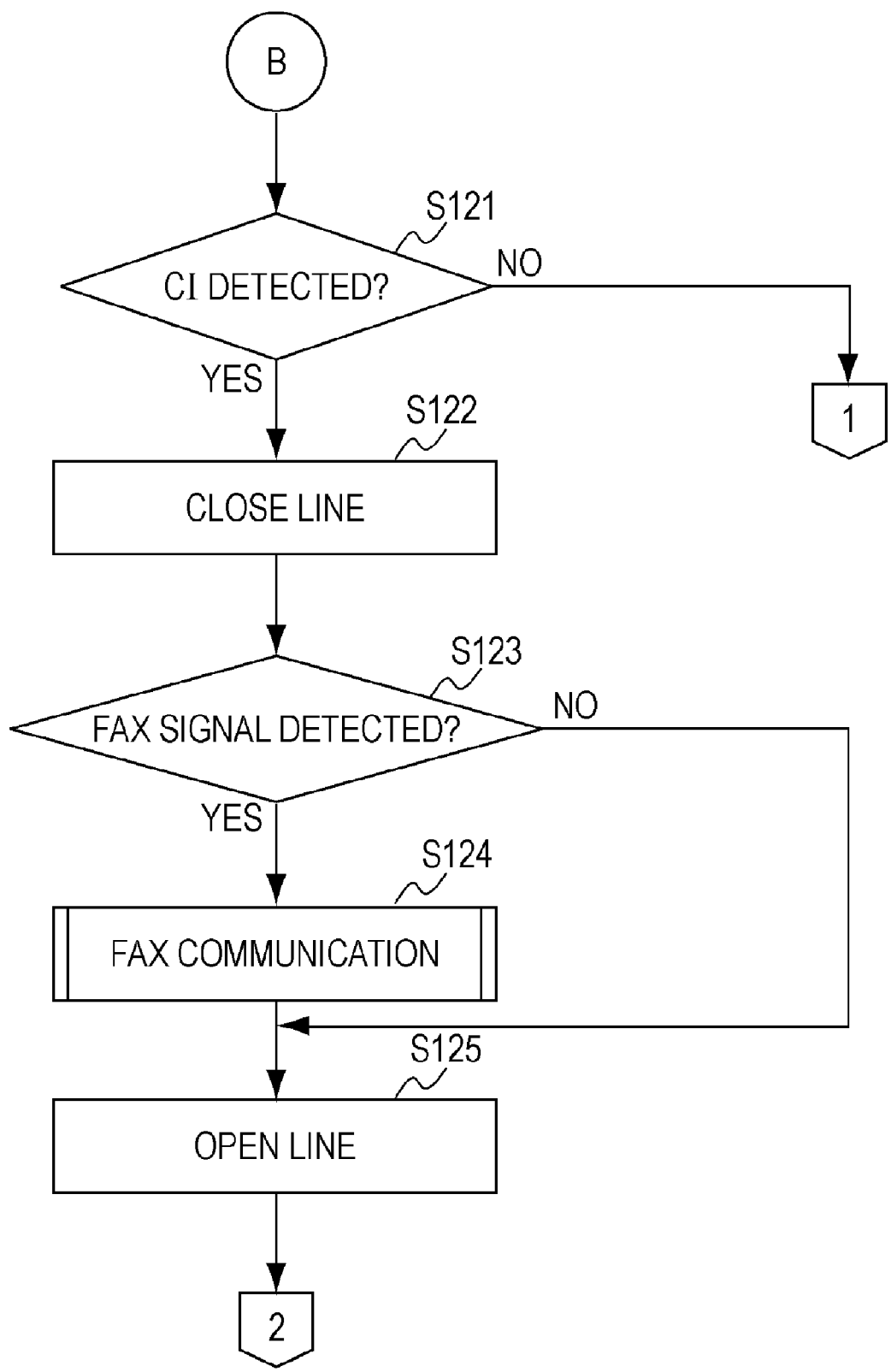
FIG. 5 illustrates an example control flow of the facsimile machine according to the exemplary embodiment.

FIG. 5 illustrates a control flow in the facsimile-only mode. In this control flow, when a calling signal from the telephone line is detected (Yes in Step S121), the line is closed (captured; Step S122). Subsequently, when a facsimile signal is detected (Yes in Step S123), the facsimile communication is performed (Step S124). When the facsimile communication is completed, the line is opened (Step S125). On the other hand, when no facsimile signal is detected (No in Step S123), the line is forcedly opened in Step S125.

Figure 6:
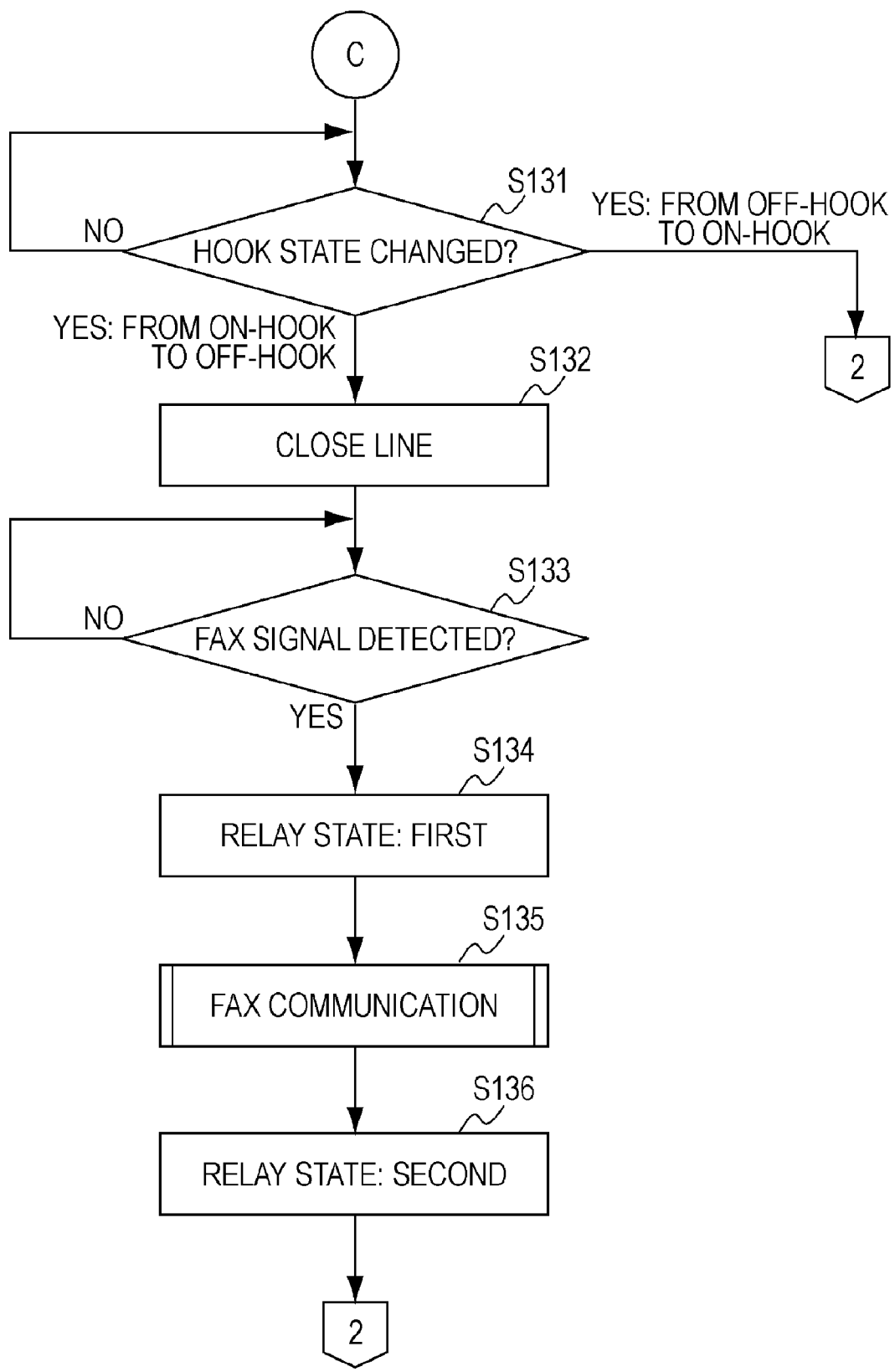
FIG. 6 illustrates an example control flow of the facsimile machine according to the exemplary embodiment.

FIG. 6 illustrates a control flow in the telephone-priority mode. In this control flow, the voltage detection portion 161 detects whether the state of the external telephone is changed from on-hook to off-hook in response to a call from the telephone line. When it is determined that the state of the external telephone is changed from on-hook to off-hook in Step S131, the line is closed in Step S132. A facsimile signal is detected in Step S133. When it is Yes in Step S133, the relay 152 is switched to the first state (Step S134), and facsimile communication is performed (Step S135). After the facsimile communication, the relay is switched to the second state (Step S136).

The operation modes of the facsimile machine have been described above. In the above-described exemplary embodiment, the receive mode of the apparatus is selected from three (a plurality of) options. However, the number of modes is not limited to three.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-276979 filed Oct. 28, 2008, which is hereby incorporated by reference herein in its entirety.

What is claimed is:

1. A facsimile machine, capable of being connected to an external telephone, including a data access apparatus in the form of a semiconductor device that performs signal transmission/reception via a public line, the facsimile machine comprising:
   a power supply unit configured to output a calling signal and supply power to the external telephone;
   a relay configured to switch between a first state in which the external telephone is connected to the power supply unit and a second state in which the external telephone is connected to the public line;
   a detection unit configured to detect a state of a signal line between the power supply unit and the relay; and
   a control unit configured to issue an output instruction of the calling signal to the power supply unit on the basis of a signal received by the data access apparatus and a detection result obtained by the detection unit in the first state.

2. The facsimile machine according to claim 1, wherein the data access apparatus includes a second detection unit configured to detect a signal level of a signal line between the public line and the external telephone, and the control unit determines whether the external telephone is on-hook or off-hook on the basis of the detection result obtained by the detection unit when the relay is in the first state, and determines whether the external telephone is on-hook or off-hook on the basis of a detection result obtained by the second detection unit when the relay is in the second state.

3. The facsimile machine according to claim 1, wherein the detection unit includes a one-way photocoupler.

4. The facsimile machine according to claim 1, wherein the power supply unit is configured to generate a voltage used for detection performed by the detection unit and a voltage used for outputting the calling signal.

5. An apparatus comprising:
   a receiving unit configured to receive a signal via a public line;
   a power supply unit configured to output a calling signal and supply power to an external telephone;
   a relay configured to switch between a first state in which the external telephone is connected to the power supply unit and a second state in which the external telephone is connected to the public line;
   a first detection unit configured to detect a state of a signal line between the power supply unit and the relay; and a control unit configured to issue an output instruction of the calling signal to the power supply unit based on a signal received by the receiving unit and a detection result obtained by the first detection unit in the first state.

6. The apparatus according to claim 5, further comprising a second detection unit configured to detect a signal level of a signal line between the public line and the external telephone.

7. The apparatus according to claim 6, wherein
the control unit determines whether the external telephone is on-hook or off-hook based on the detection result, and determines whether the external telephone is on-hook or off-hook based on a detection result obtained by the second detection unit when the relay is in the second state.

8. The apparatus according to claim 5, wherein the first detection unit includes a one-way photocoupler.

9. The apparatus according to claim 5, wherein the power supply unit is configured to generate a voltage used for detection performed by the first detection unit and a voltage used for outputting the calling signal.

10. A method comprising:
receiving a signal via a public line;
outputting a calling signal and supplying power to an external telephone by a power supply unit;
switching, by a relay, between a first state in which the external telephone is connected to the power supply unit and a second state in which the external telephone is connected to the public line;
detecting a state of a signal line between the power supply unit and the relay by a first detection unit; and
issuing an output instruction of the calling signal to the power supply unit based on the received signal and a detection result obtained by the first detection unit in the first state.

11. The method according to claim 10, further comprising detecting a signal level of a signal line between the public line and the external telephone by a second detection unit.

12. The method according to claim 11, further comprising:
determining whether the external telephone is on-hook or off-hook based on the detection result, and determining whether the external telephone is on-hook or off-hook based on a detection result obtained by the second detection unit when the relay is in the second state.

13. The method according to claim 10, wherein the first detection unit includes a one-way photocoupler.

14. The method according to claim 10, further comprising generating a voltage used for detection performed by the first detection unit and a voltage used for outputting the calling signal.

* * * * *